United States Patent Office 3,285,731
Patented Nov. 15, 1966

3,285,731
MAGNESIUM POTASSIUM PHOSPHATE-CONTAINING FERTILIZER AND PROCESS
Murrell L. Salutsky, Silver Spring, and James M. Sanborn, Dayton, Md., assignors to W. R. Grace & Co., New York, N.Y., a corporation of Connecticut
No Drawing. Filed July 22, 1963, Ser. No. 296,445
14 Claims. (Cl. 71—33)

This application is a continuation-in-part of U.S. Serial Number 179,272, filed March 5, 1962, and now abandoned.

This invention relates to methods of fertilizing and more specifically to methods for supplying the potassium and optionally some of the trace element requirements of growing plants. The invention further relates to complete fertilizer compositions which are long-lasting and essentially non-burning, and to methods of fertilizing with these complete fertilizer compositions.

There has for some time been a need for a method of supplying potassium to growing plants at proper rates for prolonged periods of time. This need is particularly acute in applications where heavy irrigation is required, for example, with certain horticultural crops. It has also become evident in areas where potassium levels are low, requiring applications at extremely high rates to correct the deficiency.

The necessity for supply so-called "trace elements" to various plants has recently become increasingly evident to agronomists (see e.g., British Patent 741,378; November 30, 1955). These elements are called "trace elements" because of the very small amounts in which they are found in plants. They are, however, just as necessary for promotion of plant growth as the better known major elements, e.g., phosphorus and nitrogen. Apparently, none of the trace elements except iron enters into a permanent protoplasmic compound within the plant. There is evidence that the trace elements catalyze or activate many of the chemical reactions which occur during plant growth (see, e.g., the British patent cited above).

In general, complete fertilizers are designated in the trade as those having substantial quantities of nitrogen, phosphorus and potassium. Thus, complete fertilizers are usually categorized by their N, $P_2O_5$ and $K_2O$ content. For example, a 5–10–5 fertilizer would contain 5% by weight nitrogen, 10% by weight phosphorus (as $P_2O_5$) and 5% by weight potassium (as $K_2O$). The $P_2O_5$ content is, according to industry standards, the amount of $P_9O_5$ that is available for use by the plant that is fertilized.

In accordance with general practice in the art, nutrients are supplied to growing plants by application of chemical compounds containing the same to the plant or to the soil surrounding the plant. Most of the commercially available fertilizers use water soluble salts of the various nutrient elements for this purpose. Typical fertilizer sources thus contain such compounds as superphosphate, triple superphosphate, ammonium phosphates, ammonium sulfates and the like. Potassium is usually supplied by potassium chloride, potassium sulfate or potassium nitrate; or minerals containing these potassium salts, e.g., kainite, langbeinite and the like. Trace elements are also usually supplied to soils in the form of water soluble salts, e.g., chlorides or sulfates.

Many problems have occurred in following the known practices. It is, for instance, a well known fact that the germination of seeds may be prevented, or that established crops may be injured by the presence of too much soluble salt in the soil. This phenomenon may occur even though all of the elements which the plant requires for its proper nutrition are present in normal proportions to one another, and substances that exhibit specific plant toxicity effects are not present in excess. This type of injury must therefore be connected with the high concentrations of salts in the soil solution, and it has been commonly thought that the elevated osmotic pressure of such solutions is responsible for such injury. This has been borne out by experimental studies which have clearly demonstrated that growth reductions of several crops was linear with the increasing osmotic pressure of the substrate over the range from 0.4 to 4.4 atmospheres and that a number of crop species died when the osmotic pressure of the culture reached 4.5 atmospheres.

The osmotic pressure produced in the soil solution by a given salt application is the result of many factors. Among these may be mentioned the quantity of salt added, the amount of moisture in the soil, base exchange and other reactions into which the added salt may enter, temperature, and the amount of biological action in the soil.

As well, the composition of the fertilizer, especially the relative proportion of the divalent and monovalent elements is of particular importance insofar as the dissociation of the fertilizer salts into ions is concerned. It must be recalled that osmotic pressure, as a colligative property of solutions, is dependent primarily on the number rather than the nature of the particles formed. However, the larger and more complex the particles, the less likely they are to affect the properties of the solution, since pure colligative properties are exhibited to the greatest degree in ideal solutions. Hence, it is not difficult to see why certain larger units, such as phosphates have the least effect on this situation.

The actual damage done is an effect known as "burning" because roots may be blackened or browned, or firing or scorching of the leaves may occur. In cases of severe excess of salt in the soil solutions, roots may actually lose water by osmosis. The reason for such a transaction is easily understood when the principle of osmosis is recalled. Osmotic pressure represents the tendency of the solvent, in this case water, to distill through a semipermeable membrane, in this case the cell wall, from a region containing a solution of high vapor pressure, in this case the interior of the cells of plants, to one of lower vapor pressure, in this case, the exterior of the cells of plants, i.e., to the soil solution. This situation of unequal vapor pressures is due to the difference in the concentrations of the "solutions" on the two sides of the cell wall. On the one side there is the fertilizer dissolved in the moisture available in the soil thereby making a fairly concentrated solution. On the other side, i.e., on the inside of the cell, the solution comprises protoplasm, a viscid, grayish, translucent, colloidal substance of granular structure and complex composition. In it are dissolved the minerals, enzymes, and other constituents necessary for the life of the cell.

When the vapor pressure outside the cell is sufficiently low, the water from the protoplasm leaves the cell thereby resulting in protoplasmic shrinking or plasmolysis. The ultimate result is the total destruction of the cell. It is such destruction that is generally termed plant burning and is, as has been shown, a direct consequence of heedless fertilization.

Leaves may be damaged in either of two ways. When roots are injured they cannot supply adequate water to the plant top portions and damage occurs because water losses from transpiration exceed water supply. When soluble salt levels are excessive but root damage does not occur, a gradual accumulation of salt takes place in the peripheral portions of the plant until protoplasm is denatured and death of the cells result.

However, fertilization of some type is necessary if plants are to flourish and crop yields are to be increased.

Virtually all plants require supplemental nitrogen and phosphorus, while in many areas potassium and various trace elements must be supplied.

It is an object of this invention to provide complete fertilizers, containing each of the major nutrient elements N, P and K and many of the necessary trace elements as well, in a non-burning form which provides long-lasting nutrition to plants. It is another object of this invention to provide a method for supplying to plants over prolonged periods of time all of the major elements and many of the trace elements needed for proper plant growth. It is still another object of this invention to provide a method for supplying potassium nutrient over prolonged periods of time and without burning to growing plants deficient in this element. Further objects of the invention will be apparent to those skilled in the art in view of the more detailed description which follows.

It has been discovered that the potassium requirements of growing plants can be supplied to the plants without burning and over long periods of time by applying magnesium potassium phosphates to the soil in which the plants are growing, or to the plants themselves. Furthermore, the magnesium component is assimilated by the plant. In addition, phosphorus is readily available to the plants from the phosphate portion of the compound.

It has further been discovered that intimate granulated magnesium potassium phosphate with magnesium ammonium phosphate in suitable proportions can be used as a complete fertilizer having controlled nutrient release. By intimate mixture we mean mixtures prepared by either co-granulating magnesium ammonium phosphate with magnesium potassium phosphate which has been separately prepared, or granulating the composition obtained as a result of co-precipitating magnesium ammonium phosphates with magnesium potassium phosphates each of the major required elements (i.e., N, P, and K) and at the same time supply magnesium. The elements are all available to the plant for prolonged periods of time. Furthermore, all components of the mixture are slowly soluble so that the fertilizer is non-burning, i.e., causes no plasmolysis. Additionally, where trace elements such as iron, manganese, cobalt, copper, zinc and molybdenum are needed, these compounds can be readily furnished by adding them to the blend of magnesium potassium phosphate and magnesium ammonium phosphate in the form of ferrous ammonium phosphate, manganese ammonium phosphate or manganese potassium phosphate, cobalt ammonium phosphate or cobalt potassium phosphate, copper ammonium phosphate or copper potassium phosphate, zinc ammonium phosphate or zinc potassium phosphate, and ammonium phosphomolybdate respectively.

The compositions of our process can be prepared in any one of several ways. The desirability of any one method over another depends entirely upon the available equipment and resources.

The simplest method is to granulate magnesium ammonium phosphate with anywhere from 1 to 99% by weight of magnesium potassium phosphate. Where it is desired to add trace elements, up to 10% of the above blend can be made up of 1 or more of the following compounds: ferrous ammonium phosphate, manganese ammonium phosphate, manganese potassium phosphate, cobalt, ammonium phosphate, cobalt potassium phosphate, copper ammonium phosphate, copper potassium phosphate, zinc ammonium phosphate, zinc potassium phosphate, and ammonium phosphomolybdate. If included, these compounds should be directly granulated with the magnesium ammonium phosphate-magnesium potassium phosphate blend.

In the alternative, the magnesium ammonium phosphate and magnesium potassium phosphate may be coprecipitated, and the coprecipitated material granulated. Any technique for coprecipitation is satisfactory. When trace elements are added in the form of the compounds listed above, they may either be added as dry materials or slurries at the granulation step, or may be coprecipitated along with the magnesium ammonium phosphate-magnesium potassium phosphate blend, and subsequently granulated as a part of the blend. The sole precaution necessary in the latter method is that ammonium phosphomolybdate cannot be coprecipitated; it can be added only at the granulation stage.

The metal potassium phosphates can be prepared by methods known to the art. One suitable method, described in Bassett and Bedwell, "Studies of Phosphates—I," Journ. Chem. Soc. (London) 1933, 854–871; involves the reaction of an aqueous solution of a water soluble metal (II) salt with an aqueous solution containing large stoichiometric excesses of dipotassium hydrogen phosphate ($K_2HPO_4$). The only anhydrous salt directly produced by this process is zinc (II) potassium phosphate. Anhydrous forms of the other metal (II) potassium phosphates of this invention are readily prepared by drying the corresponding monohydrate or the hexahydrate at temperatures greater than about 200° centigrade. It will be obvious that the anhydrous salts have increased proportional nutrient content as compared to the hydrated salts.

Magnesium potassium phosphate ($MgKPO_4$) has also been prepared by fusion of a mixture of magnesium hydrogen phosphate ($MgHPO_4 \cdot 3H_2O$) and potassium carbonate ($K_2CO_3$). Furthermore, it can be precipitated from sea water in accordance with the method described in U.S. application S.N. 152,168, filed November 14, 1961, and now Patent No. 3,195,978; the disclosure of which is incorporated herein by reference thereto.

Suitable methods for preparing the metal ammonium phosphates are described in the Bassett and Bedwell article cited above. Other methods are described in several copending applications including, inter alia, U.S. applications S.N. 51,541, filed August 24, 1960, and now Patent No. 3,126,254; S.N. 157,785, filed December 12, 1961, and now abandoned; and S.N. 169,125, filed January 26, 1962 and now abandoned; the disclosures of which are incorporated herein by reference.

The advantages of the intimately blended compositions of magnesium ammonium phosphates over other mixtures known to the art are readily understood if a consideration is made of the principles underlying these materials.

If magnesium potassium phosphate is placed alone in water or soil, it will tend to dissociate in accordance with the following equilibrium:

(1) 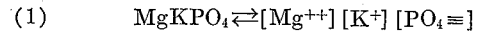

$MgKPO_4 \rightleftarrows [Mg^{++}][K^+][PO_4^{\equiv}]$

Solubility at equilibrium = 0.215 gm./100 ml.

Also, if magnesium ammonium phosphate is placed alone in water, it will similarly dissociate:

(2) 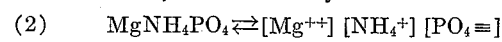

$MgNH_4PO_4 \rightleftarrows [Mg^{++}][NH_4^+][PO_4^{\equiv}]$

Solubility at equilibrium = 0.014 gm./100 ml.

However, when magnesium ammonium phosphate is placed in soil, the normal solubility is affected by the fact that the nitrifying action of the soil will convert ammonium ion to nitrate ion, thereby causing a shift in the equilibrium toward the right. Accordingly, whereas in water, the solubility of magnesium potassium phosphate is higher than that for magnesium ammonium phosphate, under actual soil conditions, the reverse is true.

Magnesium ammonium phosphate and magnesium potassium phosphate may be simply dry-blended or otherwise mixed by conventional techniques and used directly as a fertilizer material. However, under such conditions, no matter how finely divided the materials are, and no matter how carefully they are blended, each acts independently of the other in the release of nutrients. If it is desired to control the nutrient release so as to completely prevent plasmolysis and increase the longevity of the fertilizer, this can only be done by repeated applications of fairly limited quantities of material, especially for crops having relatively long growing seasons.

However, we have made the discovery that by preparing intimate blends of magnesium ammonium phosphate and magnesium potassium through the technique of granulation, we are able to control nutrient release so that a single fertilizer application results in sustained fertilization without danger of plasmolysis. The success of such blends is believed to be attributable to the following principles. When co-granulated blends of magnesium ammonium phosphate and magnesium potassium phosphate are used as fertilizers the two components no longer act independently in the release of nutrients, but rather, have a marked effect upon each other. This is due to the fact that the magnesium ions and phosphate ions released in the dissociation of the magnesium potassium phosphate [Reaction 1] exert a common ion effect upon the dissociation equilibrium of the magnesium ammonium phosphate, thereby shifting said equilibrium [Reaction 2 to the left]. Thus, the effect of nitrification of ammonium ion discussed above can be offset to the extent to which magnesium potassium phosphate is present in the final blend. We have found that the higher the ratio of magnesium potassium phosphate to magnesium ammonium phosphate in the final blend, the more controlled the rate of nitrogen release becomes. Also, potassium release from the magnesium potassium phosphate is found to be controlled by the magnesium ammonium phosphate present. Depending upon the desired longevity of the fertilizer material, and the desired limitation on nitrogen release and potassium selected quantities of magnesium potassium phosphate can be incorporated into the magnesium ammonium phosphate to insure such longevity.

In preparing complete fertilizers the magnesium potassium phosphate and magnesium ammonium phosphate are co-granulated in proportions which can vary over a wide range. Of course in any specific mixture there must be sufficient amounts of the respective salts to provide the required amounts of N, $P_2O_5$ and $K_2O$ for the particular application at hand. In many instances, it is desirable to prepare a complete fertilizer having an N–$P_2O_5$–$K_2O$ ratio of 6–40–6. For other common applications, N–$P_2O_5$–$K_2O$ ratios of 7–40–3.5 and 5–40–10 may be preferable. In any instance, the controlling effect discussed above will be shown.

Specific trace element compounds to be used in any one mixture will also depend upon the particular application, i.e., primarily upon the desirability or necessity for any specific trace elements in that application, and upon the amount of any of the various trace elements needed. As will be apparent many plant deficiencies can be alleviated or corrected by suitable choice of small additional quantities of metal (II) potassium phosphates and/or mixture of metal (II) ammonium phosphates.

We have found that for purposes of achieving the control of nitrification and fertilizer longevity, that almost any ratio of metal ammonium phosphates to metal potassium phosphate can be employed. The rate of release of nitrogen has been affected by as little as 1% magnesium potassium phosphate within the final blend, and further, there is still some nitrogen release at 99% magnesium potassium phosphate.

The materials described in the instant invention can be readily granulated by any conventional method. One very simple and efficient granulating technique comprises mixing desired proportions of the finely divided solid phosphates with small amounts (e.g., 3 to 20% by weight of the total solids) of water in an ordinary rotary drum, rotary pan or pug mill. Oversize granules can be crushed and recycled together with undersize particles to obtain the desired control of product wetness and particle size.

The phosphates used in this invention have very low water solubility, thus are highly resistant to leaching away by surface water or heavy rains, are resistant to fixation by the soil, and are non-burning, i.e., do not cause plasmolysis. Nevertheless, the nutrient content of these compounds is readily available to plants, and remains available for very long periods of time. As a result good plant growth is obtained frequently with only one fertilizer application per growing season.

Pertinent properties of some metal (II) potassium phosphates are shown in Table I, below:

TABLE I

*Metal (II) potassium phosphates*

| Properties | Formula | | | | |
|---|---|---|---|---|---|
| | $MgKPO_4 \cdot H_2O$ | $ZnKPO_4$ | $MnKPO_4 \cdot H_2O$ | $CuKPO_4 \cdot H_2O$ | $CoKPO_4$ |
| Total $P_2O_5$ (Weight Percent) | 38.70 | 36.20 | 34.60 | 33.40 | 37.30 |
| Available $P_2O_5$ (Weight Percent)[1] | 38.54 | | | | |
| Total $K_2O$ (Weight Percent) | 25.87 | 20.48 | 21.72 | 21.56 | 24.32 |
| $K_2O$ (Weight Percent, A.O.A.C. Method)[1] | 25.42 | 15.97 | 20.42 | 21.68 | 24.08 |
| Metal (Weight Percent) | 14.22 | 31.29 | 25.60 | 29.16 | 30.43 |
| Solubility in Water (grams/100 milliliters at 25° C.) | 0.215 | <0.1 | <0.1 | <0.1 | <0.1 |

[1] Determined in accordance with methods of analysis prescribed by the Association of Official Agricultural Chemists (A.O.A.C.)

Anhydrous magnesium potassium phosphate prepared by fusion of magnesium hydrogen phosphate trihydrate ($MgHPO_4 \cdot 3H_2O$) and potassium carbonate ($K_2CO_3$) gave the following analysis:

| | Percent |
|---|---|
| Total $P_2O_5$ | 43.10 |
| Available $P_2O_5$ | 40.62 |
| Total $K_2O$ | 29.84 |
| $K_2O$ (A.O.A.C. method) | 7.01 |

Pertinent properties of some metal (II) ammonium phosphates are shown in Table II.

TABLE II

| Compound | Properties | | | | Solubility, grams/100 milliliters of $H_2O$ at 25° C. |
|---|---|---|---|---|---|
| | Percent N | Percent Total $P_2O_5$ | Percent Available $P_2O_5$ | Percent Me | |
| $MgNH_4PO \cdot H_2O$ | 9.02 | 45.69 | 39–45 | 15.65 | .014 |
| $MgNH_4PO_4 \cdot 6H_2O$ | 5.71 | 28.92 | 28 | 9.92 | .018 |
| $MnNH_4PO_4 \cdot H_2O$ | 7.53 | 38.16 | 15 | 29.53 | .0038 |
| $CuNH_4PO_4 \cdot H_2O$ | 7.20 | 36.48 | 36 | 32.66 | .0009 |
| $ZnNH_4PO_4$ | 7.85 | 39.79 | 16 | 36.65 | .0018 |
| $CoNH_4PO_4 \cdot H_2O$ | 7.37 | 37.36 | 37 | 31.03 | .0017 |
| $FeNH_4PO_4 \cdot H_2O$ | 7.5 | 37.98 | 36–37 | 29.89 | .0095 |

Any of the known inert materials can be used to dilute the complete mixed fertilizer to the desired level of N, $P_2O_5$ and $K_2O$. Such diluents include, e.g., sand, clay, gypsum, lime, dolomite, and other like materials all known to the art.

Typical examples of the complete fertilizers of this invention are those described in Table III. They were prepared from magnesium potassium phosphate and magnesium ammonium phosphate in the proportions indicated. The magnesium ammonium phosphate used was a fertilizer grade material analyzing 8.1% N and 42.9% $P_2O_5$ while the magnesium potassium phosphate analyzed 38.7% $P_2O_5$ and 25.9% $K_2O$. The dry materials were mixed with water and granulated in a pan granulator to form complete fertilizers having the properties shown in Table III.

TABLE III

*Complete fertilizers from $MgNH_4PO_4 \cdot H_2O$ and $MgKPO_4 \cdot H_2O$*

| Complete Fertilizer | Weight Percent $MgNH_4PO_4 \cdot H_2O$ | Weight Percent $MgKPO_4 \cdot H_2O$ | Weight Percent N | Weight Percent $P_2O_5$ | Weight Percent $K_2O$ |
|---|---|---|---|---|---|
| A | 76.2 | 23.8 | 6.2 | 41.9 | 6.2 |
| B | 61.6 | 38.4 | 5.0 | 41.3 | 10.0 |
| C | 86.5 | 13.5 | 7.0 | 42.3 | 3.50 |

The following examples illustrate the effectiveness of magnesium potassium phosphate as a potash source:

EXAMPLE 1

Perennial rye grass (*Lolium perenne*, L.) was planted in No. 3 cans. Eight cans were used per treatment and treatments were randomized. Three separate fertilizer treatments were used. In each treatment ammonium nitrate ($NH_4NO_3$) was added to the soil in amounts equivalent to 300 pounds of nitrogen per acre. Phosphorus was added in amounts equivalent to 450 pounds $P_2O_5$ per acre and potassium was added in two treatments in amounts equivalent to 300 pounds $K_2O$ per acre. These requirements were supplied by adding the following compounds:

| Treatment | $P_2O_5$ | $K_2O$ |
|---|---|---|
| 1 | $MgKPO_4$ | $MgKPO_4$. |
| 2 | Triple superphosphate | $K_2SO_4$. |
| 3 | do | Blank. |

The grass was clipped at two week intervals beginning one month after planting and continuing for approximately 14 weeks, at which time the available nitrogen became the controlling growth factor. The clippings were weighed after each cutting.

It was found that the crop yield under treatments 1 and 2 were consistently better than that for treatment 3 (no $K_2O$). The yield from treatment 1 ($P_2O_5$ and $K_2O$ supplied by $MgKPO_4$) was consistently equal to or slightly better than that from treatment 2 (triple superphosphate and $K_2SO_4$). Cumulative yields for treatments 1 and 2 were 134% and 132.5%, respectively, of the cumulative yield from the control treatment with no $K_2O$ (treatment 3). These experiments demonstrate that magnesium potassium phosphate at the state application rates was as effective as $K_2SO_4$ and triple superphosphate in supplying the $K_2O$ and $P_2O_5$ requirements, respectively, of the growing plants.

EXAMPLE 2

Separate 28 pound samples of sandy loam soil from the far Western United States were treated with $MgKPO_4 \cdot H_2O$ and $K_2SO_4$ in amounts equivalent to 40, 80 and 160 pounds of actual K per acre. All samples received $(NH_2)_2SO_4$ in amounts equivalent to 100 pounds of N per acre and the $K_2SO_4$-treated samples received $Ca(H_2PO_4)_2 \cdot H_2O$ in amounts equivalent to 45 pounds of actual P per acre. No P was added to the $MgKPO_4 \cdot H_2O$ samples. The treatments were replicated and randomized. Cotton was planted in the thus treated soils and samples of the then most recently natural petioles were cut at 30 day intervals for determination of K and P taken up by the plant. During the growth period further N (as $(NH_4)_2SO_4$) was added as needed (determined by plant analysis). Results are shown in Table IV.

TABLE IV

*Concentration of K and P in cotton plant petioles*

| Treatment | Age of Plant | | | | | | | |
|---|---|---|---|---|---|---|---|---|
| | 30 days | | 60 days | | 90 days | | 120 days | |
| | Percent K | Percent P | Percent K | Percent P | Percent K | Percent P | Percent K | Percent P |
| Pounds K per Acre: | $MgKPO_4$ | | | | | | | |
| 0 | 1.27 | 0.41 | 0.63 | 0.25 | 9.49 | 0.12 | 0.19 | 1.16 |
| 40 | 3.99 | 0.21 | 1.75 | 0.20 | 2.00 | 0.11 | 0.44 | 0.18 |
| 80 | 4.26 | 0.17 | 1.85 | 0.26 | 2.63 | 0.12 | 0.69 | 0.13 |
| 160 | 6.09 | 0.26 | 3.75 | 0.42 | 2.88 | 0.21 | 0.94 | 0.22 |
| | $K_2SO_4$ plus $Ca(H_2PO_4)_2 \cdot H_2O$ | | | | | | | |
| 0 | 1.27 | 0.41 | 0.63 | 0.25 | 1.49 | 0.12 | 0.19 | 0.16 |
| 40 | 2.68 | 0.34 | 1.12 | 0.32 | 1.56 | 0.14 | 0.50 | 0.12 |
| 80 | 4.55 | 0.45 | 2.63 | 0.39 | 2.18 | 0.12 | 0.38 | 0.09 |
| 160 | 6.12 | 0.43 | 3.75 | 0.43 | 2.38 | 0.18 | 0.44 | 0.13 |

The data of Table IV clearly shows that $MgKPO_4$ is as good as or better than $K_2SO_4$ as a source of potassium nutrient for cotton plants at all stages of growth. The data also indicates that although more phosphorus was taken up from $Ca(H_2PO_4)_2 \cdot H_2O$ during initial stages of growth, at later stages $MgKPO_4$ is equivalent or better as a source of phosphorus nutrient.

EXAMPLE 3

A study was made in which plots of Kentucky blue grass were treated with a 7-40-4 blend coprecipitated, granulated magnesium ammonium phosphate and magnesium potassium phosphate. A duplicate set of plots were treated with a 7-35-7 mixture of magnesium ammonium phosphate and potassium sulfate. Both blends were applied at a rate corresponding to 1 pound of nitrogen per 100 square feet. At periodic intervals, the grass in each plot was clipped, oven-dried, and weighed. The data shown in Table V below indicate the results of the study.

TABLE V

*Dry weight of Kentucky blue grass*

| Harvest Time | 7-40-4 (grams) | 7-35-7 (grams) |
|---|---|---|
| 2 weeks after germination | 0.42 | 0.59 |
| 4 weeks | 1.40 | 1.58 |
| 6 weeks | 2.12 | 3.08 |
| 8 weeks | 1.72 | 1.76 |
| 10 weeks | 1.56 | 0.49 |
| 12 weeks | 1.26 | 0.51 |

It can be seen from the above data that when magnesium potassium is used in an intimate blend with magnesium ammonium phosphate as a potash source, the nutrients, primarily nitrogen, exhibit a more uniform release rate, as manifest in the extended duration of response by the plant. With the soluble material, the nutrients were quickly released and soon depleted, as indicated by the low yields at and after 10 weeks.

The following examples illustrate the control of the rate of release of nitrogen in co-granulated blends of magnesium ammonium phosphate/magnesium potassium phosphate:

EXAMPLE 4

Tissue analyses were performed on chrysanthemums, half of which had been fertilized with a dry blend of granules of magnesium ammonium phosphate and magnesium potassium phosphate, and the remaining half with magnesium ammonium phosphate co-granulated with magnesium potassium phosphate. In both instances the overall blend comprised 8 parts of magnesium potassium phosphate and 25 parts of magnesium ammonium phosphate, giving an overall N—$P_2O_5$—$K_2O$ ratio of 6–40–6. The materials were applied at a rate of 10 pounds per cubic yard. The results of this experiment are summarized in Table VI. It can be seen that in the dry blended material, nitrogen recovery is increased as compared with the co-granulated material, while potassium recovery is decreased. This clearly demonstrates the ability of magnesium potassium phosphate, in intimate contact with magnesium ammonium phosphate, to control, restrict and consequently prolong nitrogen release.

In all tests, the fertilizer materials were applied at a rate which was equivalent to 300 pounds of nitrogen per acre. The results of the studies are summarized in Table VIII.

It was seen that in all cases, the overall yield was significantly higher for the co-granulated fertilizer than for the dry-blended material and the soluble control.

TABLE VIII

*Yield (dry weight) as percent of soluble control*

| Blend composition | Dry blend | Co-granulated |
|---|---|---|
| 1 part N:2 parts $K_2O$ | 142 | 169 |
| 1 part N:1 part $K_2O$ | 124 | 179 |
| 1 part N:½ part $K_2O$ | 31 | 141 |

We claim:

1. A complete non-burning particulate solid fertilizer consisting essentially of magnesium ammonium phosphate having intimately blended therewith from 1 to 99% magnesium potassium phosphate.

2. A complete non-burning particulate solid fertilizer composition consisting essentially of magnesium ammonium phosphate having intimately blended therewith from 1 to 99% magnesium potassium phosphate and having up to 10% of at least 1 member from the group consisting of ferrous ammonium phosphate, manganese ammonium phosphate, manganese potassium phosphate, cobalt ammonium phosphate, cobalt potassium phosphate,

TABLE VI

*Tissue analyses, chrysanthemums*

| Treatment | Harvest #1 | | | | Harvest #2 | | | |
|---|---|---|---|---|---|---|---|---|
| | N | | K | | N | | K | |
| | Percent | Recovery, mgm./plant | Percent | Recovery, mgm./plant | Percent | Recovery, mgm./plant | Percent | Recovery, mgm./plant |
| Co-granulated $MgKPO_4$-$MgNH_4PO_4$ | 4.88 | 26.70 | 6.00 | 32.88 | 1.73 | 65.68 | 1.73 | 65.85 |
| Dry-blended $MgKPO_4$-$MgNH_4PO_4$ | 6.26 | 28.70 | 3.06 | 11.70 | 4.42 | 82.32 | 0.97 | 18.34 |

EXAMPLE 5

The materials of Example 4 were used to fertilize chrysanthemums at several different rates. Table VII shows the dry-weight yield of the plants fertilized by the various materials. Clearly, the co-granulated magnesium ammonium phosphate-magnesium potassium phosphate material is superior as a fertilizer to a dry-blend comprised of similar ingredients.

TABLE VII

*Chrysanthemum yield, in grams*

| Rate, in pounds of N per cubic yard | Dry-blended $MgKPO_4$-$MgNH_4PO_4$ | Co-granulated $MgKPO_4MgNH_4PO_4$ |
|---|---|---|
| 0.6 | 10.8 | 20.1 |
| 1.2 | 26.2 | 27.1 |
| 1.8 | 26.7 | 35.3 |
| Total yield | 63.7 | 82.5 |

EXAMPLE 6

A series of studies were performed to further demonstrate the advantages of co-granulated magnesium ammonium phosphate and magnesium potassium phosphate, as compared with dry blends of the same materials, and further as compared with a soluble complete fertilizer as a control. The soluble material used was a blend of ammonium nitrate, triple superphosphate and potassium sulfate, having an N-$P_2O_5$-$K_2O$ ratio of 6–40–6.

copper ammonium phosphate, copper potassium phosphate, zinc ammonium phosphate, zinc potassium phosphate and ammonium phosphomolybdate.

3. A complete, non-burning, particulate, solid fertilizer consisting essentially of magnesium ammonium phosphate coprecipitated with from 1 to 99% by weight of magnesium potassium phosphate.

4. A complete, non-burning, particulate, solid fertilizer consisting essentially of magnesium ammonium phosphate, coprecipitated with from 1 to 99% by weight of magnesium potassium phosphate and up to 10% of at least one member from the group consisting of ferrous ammonium phosphate, manganese ammonium phosphate, manganese potassium phosphate, cobalt ammonium phosphate, cobalt potassium phosphate, copper ammonium phosphate, copper potassium phosphate, zinc ammonium phosphate and zinc potassium phosphate.

5. The composition described in claim 4 cogranulated with up to 5% by weight of ammonium phosphomolybdate.

6. A complete, non-burning, particulate, solid fertilizer consisting essentially of magnesium ammonium phosphate coprecipitated with from 1 to 99% by weight of magnesium potassium phosphate, and cogranulated with up to 10% of at least one member from the group consisting of ferrous ammonium phosphate, manganese ammonium phosphate, manganese potassium phosphate, cobalt ammonium phosphate, cobalt potassium phosphate, copper ammonium phosphate, copper potassium phosphate, zinc ammonium phosphate, zinc potassium phosphate, and ammonium phosphomolybdate.

7. A complete, non-burning, particulate, solid fertilizer consisting essentially of magnesium ammonium phosphate cogranulated with from 1 to 99% by weight of magnesium potassium phosphate.

8. A complete, non-burning, particulate, solid fertilizer consisting essentially of magnesium ammonium phosphate cogranulated with from 1 to 99% by weight of magnesium potassium phosphate and up to 10% of a member from a group consisting of ferrous ammonium phosphate, manganese ammonium phosphate, manganese potassium phosphate, cobalt ammonium phosphate, cobalt potassium phosphate, copper ammonium phosphate, copper potassium phosphate, zinc ammonium phosphate, zinc potassium phosphate, and ammonium phosphomolybdate.

9. A method for providing a complete non-burning fertilizer composition comprising coprecipitating magnesium ammonium phosphate with 1 to 99% by weight of magnesium potassium phosphate and granulating the coprecipitated mixture.

10. The method of providing a complete non-burning fertilizer composition comprising coprecipitating magnesium ammonium phosphate with 1 to 99% by weight of magnesium potassium phosphate and up to 10% of at least 1 member from the group consisting of ferrous ammonium phosphate, manganese ammonium phosphate, manganese potassium phosphate, cobalt ammonium phosphate, cobalt potassium phosphate, copper ammonium phosphate, copper potassium phosphate, zinc ammonium phosphate, and zinc potassium phosphate, and granulating the resulting coprecipitating mixture.

11. The method described in claim 10 wherein up to 5% by weight of ammonium phosphomolybdate is cogranulated with the coprecipitated material.

12. The method of providing a complete non-burning fertilizer composition comprising coprecipitating magnesium ammonium phosphate with 1 to 90% by weight of magnesium potassium phosphate and granulating the coprecipitated blend with up to 10% of at least one member from the group of ferrous ammonium phosphate, manganese ammonium phosphate, magnesium potassium phosphate, cobalt ammonium phosphate, cobalt potassium phosphate, copper ammonium phosphate, copper potassium phosphate, zinc ammonium phosphate, zinc potassium phosphate and ammonium phosphomolybdate.

13. The method of preparing a complete non-burning fertilizer composition comprising granulating magnesium ammonium phosphate with 1 to 99% by weight of magnesium potassium phosphate.

14. The method of providing a complete non-burning fertilizer comprising granulating magnesium ammonium phosphate with 1 to 99% by weight of magnesium potassium phosphate and up to 10% of a member from the group consisting of ferrous ammonium phosphate, manganese ammonium phosphate, magnesium potassium phosphate, cobalt ammonium phosphate, cobalt potassium phosphate, copper ammonium phosphate, copper potassium phosphate, zinc ammonium phosphate, zinc potassium phosphate and ammonium phosphomolybdate.

References Cited by the Examiner

UNITED STATES PATENTS

| 2,270,518 | 1/1942 | Ellis et al. | 71—1 |
| 2,350,982 | 1/1944 | Borst | 71—1 |
| 3,125,411 | 3/1964 | Bridger. | |
| 3,126,254 | 3/1964 | Salutsky | 23—105 |

FOREIGN PATENTS

| 362,069 | 12/1931 | Great Britain. |
| 492,595 | 9/1938 | Great Britain. |
| 741,378 | 11/1955 | Great Britain. |

S. LEON BASHORE, *Acting Primary Examiner.*

ANTHONY SCIAMANNA, *Examiner.*

T. D. KILEY, *Assistant Examiner.*

UNITED STATES PATENT OFFICE
CERTIFICATE OF CORRECTION

Patent No. 3,285,731                      November 15, 1966

Murrell L. Salutsky et al.

It is hereby certified that error appears in the above numbered patent requiring correction and that the said Letters Patent should read as corrected below.

Column 1, line 28, for "supply" read -- supplying --; line 49, for "$P_9O_5$" read -- $P_2O_5$ --; column 3, line 26, for granulated" read -- granulated compositions of --; line 35, for "phos-" read -- phosphates. Such compositions furnish to growing plants --; column 5, line 3, for "potassium" read -- potassium phosphate --; column 7, line 49, for "containing" read -- continuing --; column 8, TABLE IV, second portion, under the heading $MgKPO_4$, opposite "0" for "9.49" read -- 1.49 --; and "1.16" read -- 0.16 --; column 12, lines 3 and 17, for "magnesium", each occurrence, read -- manganese --.

Signed and sealed this 19th day of September 1967.

(SEAL)
Attest:

ERNEST W. SWIDER                            EDWARD J. BRENNER
Attesting Officer                         Commissioner of Patents